United States Patent
Ji et al.

(10) Patent No.: US 6,728,886 B1
(45) Date of Patent: Apr. 27, 2004

(54) DISTRIBUTED VIRUS SCANNING ARRANGEMENTS AND METHODS THEREFOR

(75) Inventors: Shuang Ji, Santa Clara, CA (US); Renkui Tao, Nanjing (CN)

(73) Assignee: Trend Micro Incorporated, Cupertino, CA (US)

( * ) Notice: Subject to any disclaimer, the term of this patent is extended or adjusted under 35 U.S.C. 154(b) by 0 days.

(21) Appl. No.: 09/452,918

(22) Filed: Dec. 1, 1999

(51) Int. Cl.7 .......................... G06F 11/30; G06F 12/14; H04L 9/00
(52) U.S. Cl. .......................... 713/201; 713/200; 714/26; 714/38
(58) Field of Search .................. 713/200, 201, 713/188, 155; 714/25, 26, 38; 709/202, 222, 228, 229, 224, 245

(56) References Cited

U.S. PATENT DOCUMENTS

| | | | |
|---|---|---|---|
| 5,444,850 A | 8/1995 | Chang | 709/222 |
| 5,550,984 A * | 8/1996 | Gelb | 709/245 |
| 5,623,600 A | 4/1997 | Ji et al. | 713/201 |
| 5,680,547 A | 10/1997 | Chang | 709/222 |
| 5,696,701 A * | 12/1997 | Burgess et al. | 714/25 |
| 5,696,822 A * | 12/1997 | Nachenberg | 713/200 |
| 5,889,943 A | 3/1999 | Ji et al. | 713/201 |
| 5,951,698 A | 9/1999 | Chen et al. | 714/38 |
| 5,960,170 A | 9/1999 | Chen et al. | 714/38 |

* cited by examiner

Primary Examiner—Emmanuel L. Moise
(74) Attorney, Agent, or Firm—Beyer Weaver & Thomas LLP

(57) ABSTRACT

Detecting viruses that may be transferred between a distributed computer network, such as the Internet, and a host computer. A host computer performs its own virus scanning on data, using executables code downloaded to its browser upon a request for data from the Internet, such as an HTTP request. Code is downloaded to the host computer, and is configured to create a virus scan module on the host computer upon such a request. The module is used to detect viruses in data transferred between the host computer and the Internet. Virus scanning is performed thereafter on the host computer. In cases where certain browsers may not be capable of supporting local virus scanning, code is first downloaded to determine whether local scanning is possible. If so, the virus scan module is then downloaded and executed.

28 Claims, 4 Drawing Sheets

DISTRIBUTED VIRUS SCANNING ARRANGEMENTS AND METHODS THEREFOR

BACKGROUND OF THE INVENTION

The present invention relates to methods and apparatuses for detecting viruses that may be transferred between a distributed computer network, such as the Internet, and a host computer connected thereto. More particularly, the present invention relates to improved techniques for permitting a host computer to perform its own virus scanning on HTTP transferred data using executables downloaded to its browser upon startup.

With the rising popularity of the Internet, there are now millions of users connecting to the Internet daily from their host computers to conduct e-commerce transactions, perform searches for information and/or download executable programs to enhance the capability and performance of their own host computers. The interaction between these users and the other host servers on the Internet generally involves the transfer of some amount of data, which may include both static displayable information and executable codes. Generally speaking, static displayable information refers to static information to be displayed at the host computer while executable codes or executables refer to computer instructions configured to be executed at the host computer to perform some task thereat.

In general, the vast majority of the downloadable data from the Internet represents useful or at least non-harmful content material. However, there exists a class of executable codes which, if downloaded and executed at host computers, may wreak havoc with the operating system, the hardware, and/or other software of the host computers. These executable codes are popularly known as viruses.

To combat viruses, users and administrators of computer networks (such as corporate local area networks or wide area networks) have long employed a variety of tools designed to detect and block the downloading of harmful viruses from the Internet. In a corporate local area network (LAN), for example, network administrators may employ proxy servers, which are disposed between the host computers of the LAN and the Internet, to perform virus scanning and blocking. By channeling the data transfers between the host computers of the LAN and the Internet through proxy servers, and performing virus scanning at the proxy servers, viruses may be removed from the transferred data prior to reaching the host computers where they may cause harm.

To illustrate, FIG. 1 depicts, in a simplified schematic format, a corporate environment 102 within which multiple host computers 104, 106, and 108 are interconnected via a local area network (LAN) 110. LAN 110, in addition to allowing the host computers to exchange data among themselves and/or other I/O devices or storage devices connected thereto, also facilitates data transfer between the host computers and the distributed computer network 112 (such as the Internet). As shown in FIG. 1, a proxy server 114 is interposed between LAN 110 and distributed computer network 112 to monitor data transfers between distributed computer network 112 and the host computers connected to LAN 110.

In the current art, one of the more popular application protocols for data transfers via the world wide web (WWW) is the Hypertext Transfer Protocol (HTTP). Thus, for data transfers via the world wide web, proxy server 114 typically implements the HTTP protocol. There is also shown in proxy server 114 a scan engine 116, representing the software and/or hardware portion configured to detect viruses that may be present in the HTTP data transfers. When a host computer, such as host computer 104, wishes to download data from one of the web servers connected to distributed computer network 112, e.g., one of web servers 120, 122, or 124, the data transfer therefrom traverses proxy server 114 and is scanned by scan engine 116 to ensure that the data transfer is free of viruses.

Although the virus detection arrangement of FIG. 1 performs quite well for some corporate environments, it is recognized that, for some other corporate environments or individual users, it may not be desirable to perform virus scanning only at one or more proxy servers interposed between the host computers and the Internet. This is particularly true in cases where no separate central scan engine/ proxy server is available or where there is a large number of host computers connected to each scan engine/proxy server. The latter situation may occur in, for example, organizations that employ few proxy servers, for economic or maintenance-related reasons, for a large number of users. In this situation, a few scan engine/proxy servers must perform virus scanning for a high volume of transferred data associated with a large number of host computers, resulting in a high server load and/or long delays for the data transfers. The high server load and/or long delay problems are compounded if some or most of the data transfers involve the transfers of large or multimedia files, which are increasingly offered as high speed, broad band technologies become more accessible.

One way to alleviate the bottleneck associated with the centralized virus scanning arrangement of FIG. 1 involves the use of more powerful centrally located proxy servers. However, this solution tends to be uneconomical since powerful computers tend to be specialized and expensive. Other products such as ViruScan (version 4.0.3, for example) by Network Associates of Santa Clara, Calif. employ the host computers themselves to perform the virus scanning. This approach has the advantage of leveraging on the processing and I/O resources of the host computers themselves to perform virus scanning, thereby relieving the processing bottleneck and the concomitant data transfer delays associated with centralized virus scanning arrangements. However, these products tend to be file-based, i.e., they operate by invoking file system hooks for detecting viruses residing in the persistent storage areas of the host computers (e.g., the hard or floppy drives). If the virus is not saved onto the persistent storage areas but is instead executed from the host computer's high speed, volatile memory after downloading, these file-based virus detection products tend to be ineffective. Such products cannot generally deal with network traffic directly.

A further disadvantage associated with the prior art file-based virus detection arrangement (such as the aforementioned VirusScan) relates to the requirement that the user or network administrator must manually install each copy on each host machine. Furthermore, because new viruses are introduced every now and then, the user or network administrator must also perform maintenance and upgrade frequently at each host machine to ensure that the virus detection program is properly updated to detect the latest viruses. As can be appreciated by those skilled in the art, such a requirement disadvantageously increases the workload of the human network administrators and/or leaves open the possibility that the virus scanning products are not always timely updated to detect the latest viruses.

In view of the foregoing, there are desired improved techniques for enabling distributed virus scanning on data transfers between a distributed computer network and the host computers. The improved distributed virus scanning techniques preferably employ the processing and I/O resources of the host computers themselves to alleviate processing bottleneck issues associated with the centralized virus scanning approach while substantially eliminating the burden of maintaining and updating the scanning product at each host computer individually.

SUMMARY OF THE INVENTION

The present invention relates to at least one method and apparatus for detecting viruses that may be transferred between a distributed computer network, such as the Internet, and a host computer connected thereto. More particularly, the present invention relates to improved techniques for permitting a host computer to perform its own virus scanning on HTTP transferred data using executables downloaded to its browser upon startup.

According to one aspect of the present invention, a method is provided for detecting a virus from data transferred between a host computer and the Internet, comprising: downloading to said host computer a first set of codes from a designated computer different from said host computer, said first set of codes being configured to create a virus scan module on said host computer; creating said virus scan module on said host computer responsive to a request for said data; and thereafter, employing said virus scan module to detect said virus for said data transferred between said host computer and said Internet.

According to still another aspect of the present invention, a method is provided for detecting a virus from data transferred between a browser running on a host computer and the Internet, said host computer being coupled to other host computers on a local area network (LAN), comprising: receiving at said host computer a first set of codes, said first set of codes being configured to cause said host computer to download a second set of codes from a server coupled to said LAN when a request for data from said Internet is issued from said browser, said second set of codes being configured to create a virus scan module locally on said host computer; downloading to said host computer said second set of codes from said server when said request for data from said Internet is issued from said browser; creating said virus scan module on said host computer responsive to a receipt of said second set of codes at said host computer; and thereafter, employing said virus scan module to detect said virus for said data transferred between said host computer and said Internet.

Still another aspect of the present invention provides for a method for detecting a virus from data transferred between a browser running on a host computer and the Internet, said host computer being coupled to other host computers on a local area network (LAN), comprising: receiving at said host computer a first set of codes, said first set of codes being configured to cause, if said browser is determined to be capable of supporting local virus scanning, said host computer to download a second set of codes from a server coupled to said LAN when a request for data from said Internet is issued from said browser, said second set of codes being configured to create a virus scan module locally on said host computer; determining, using said first set of codes, whether said browser is capable of performing said local virus scanning; if said browser is determined to be capable of supporting said local virus scanning, performing steps a) through c) below: a) downloading to said host computer said second set of codes from said server when said request for data from said Internet is issued from said browser, b) creating said virus scan module on said host computer responsive to a receipt of said second set of codes at said host computer, and c) thereafter, employing said virus scan module to detect said virus for said data transferred between said host computer and said Internet.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with one aspect of the present invention, there are provided systems and methods for permitting the host computers to perform distributed virus scanning using the processing and/or I/O resources at the host machines in order to relieve the bottleneck associated with the prior art technique of scanning at one or more centrally located scan engines/proxy servers. It is recognized by the inventors herein that for an average host computer, most or at least a sizable portion of the processing and I/O resources are idle most of the time while the user accesses the Internet. By way of example, although the average desktop computer today may have a processor running in excess of 400 MHz, and may be capable of performing tens of millions of calculations per second, such power typically sits unused while waiting for the user's input, or for the next data packet to be transferred, and so forth. By leveraging the processing and I/O resources of the host computer to perform virus scanning, a greater degree of scalability is achieved since each new host computer brought into the LAN does not depend entirely on the central proxy server(s) for virus scanning, but instead brings its own resources to perform its own virus scanning.

In accordance with one aspect of the present invention, a distributed virus scanning module or engine at each host computer is preferably created and/or updated each time a new browser thereat is activated and/or an initial HTTP request is issued therefrom. Preferably, the distributed virus scan engine at each host computer is created from codes/data centrally maintained at one or more servers. By way of example, the distributed virus scan engine preferably employs the information contained in virus definition files maintained at one or more servers on the LAN in order to perform its own virus scan at its host computer. In this manner, the advantages associated with centrally managed virus scanning solutions (e.g., ease of maintenance and updates as there are fewer servers involved) are achieved while the disadvantages (e.g., periodic manual updating and maintenance at each host computer) are avoided.

Figure 1:
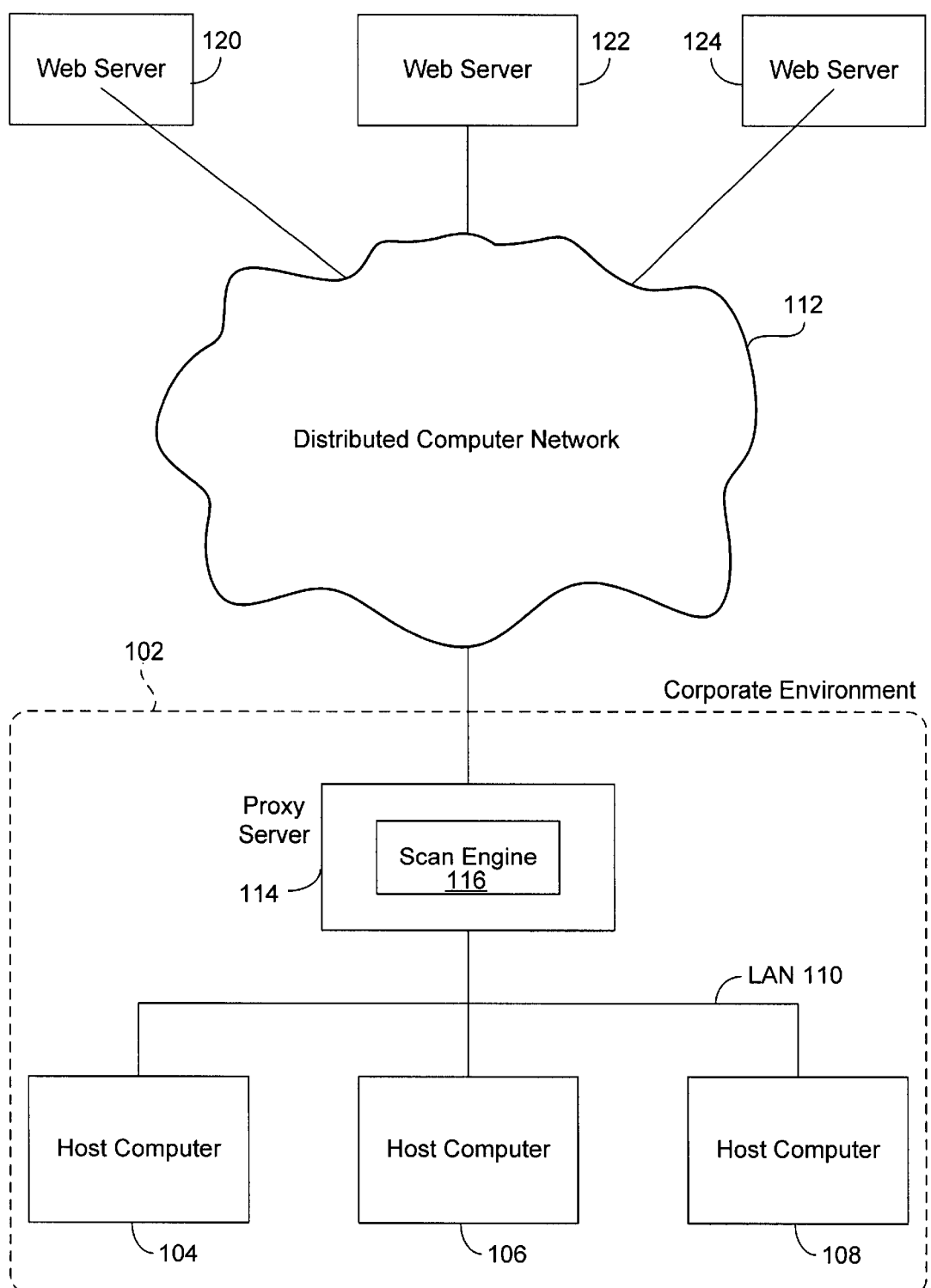
FIG. 1 depicts, in a simplified schematic format, a corporate environment within which multiple host computers are interconnected via a local area network (LAN) to facilitate discussion of one prior art arrangement for performing virus scanning.
Figure 2:
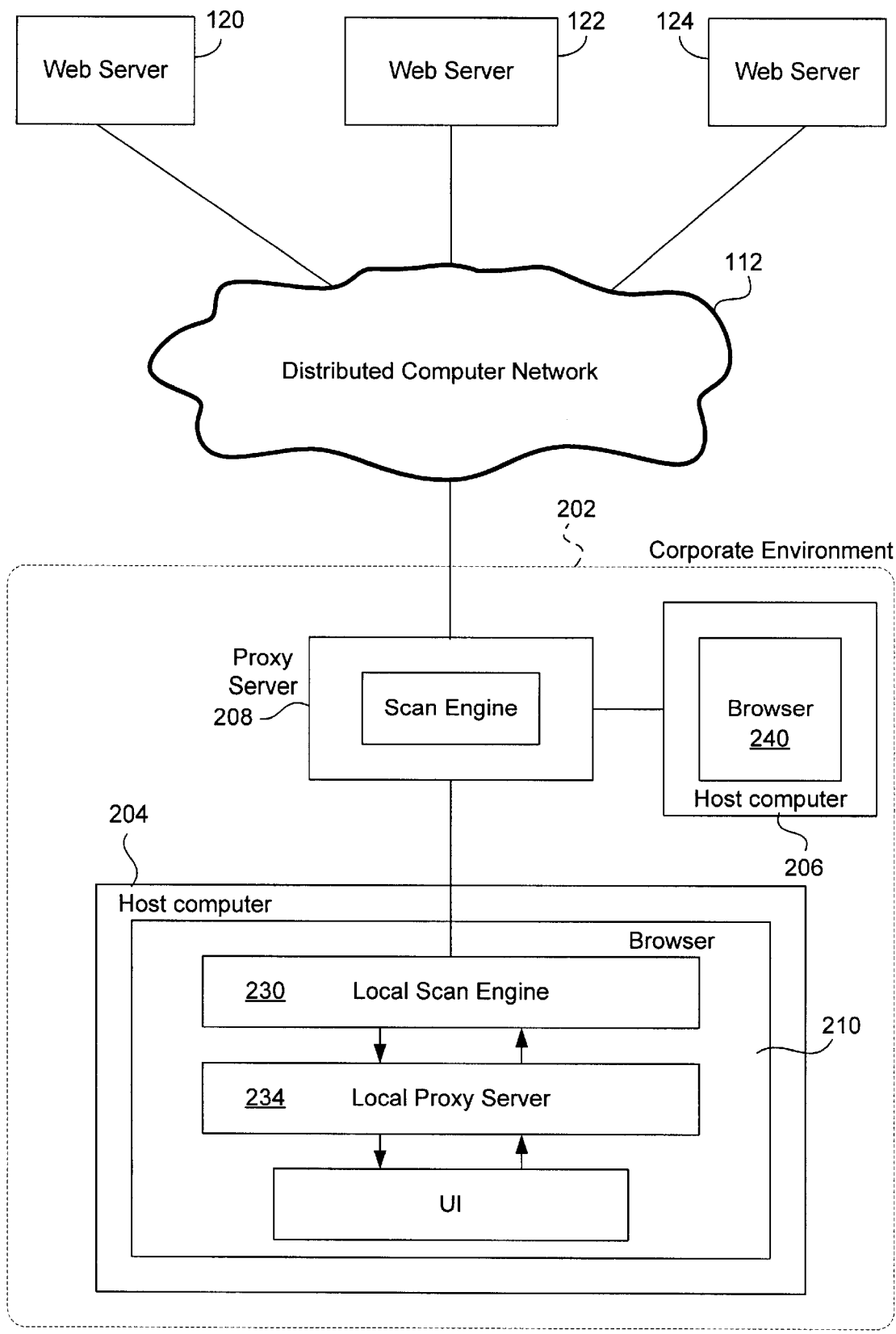
FIG. 2 illustrates, in accordance with one embodiment, a corporate environment which implements one embodiment of the inventive distributed virus scanning arrangement.

To facilitate discussion, FIG. 2 illustrates, in accordance with one embodiment, a corporate environment 202 which implements one embodiment of the inventive virus scanning arrangement. Within corporate environment 202, there is shown a host computer 204 and host computer 206, which are connected to a proxy server 208, representing in this example an HTTP proxy server that is interposed between the distributed computer network 112 (such as the internet) and the host computers of corporate environment 202. Although only two host computers are shown to simplify the discussion, it should be understood that the number of host computers, as well as the number of LANs interconnected, may be variable as desired.

Host computer 204 represents any computer that is capable of requesting and receiving data transfers from distributed computer network 112 and may be implemented using any of the suitable operating systems such as Windows™ by Microsoft Corp. of Redmond, Wash., Mac O/S by Apple Computers of Cupertino, Calif., UNIX, Linux (a freely distributed operating system), or may even represent a network computer (NC) that does not have its own operating system and relies primarily on a browser for downloading and executing its applications.

In the example of FIG. 2, host computer 204 may access distributed computer network 112 via a commercial browser such as Internet Explorer Version 4.X by Microsoft Corporation, or Netscape Communicator Version 4.X from America Online Corp. of Vienna, Virginia. As is well known, these browsers may be employed to issue HTTP requests to distributed computer network 112 and to receive HTTP data therefrom.

To implement local virus scanning in accordance with one aspect of the present invention, the browser 210 within host computer 204 is set to request an auto-config script, i.e., a set of codes that automatically starts upon the occurrence of some predefined event, from proxy server 208 when browser 210 is started up. In the example of the product Internet Explorer 4.X by Microsoft Corp., this setting may be accomplished by choosing the tab "View" and then "Internet Options" and then "Connection" and then "Configure" to access the dialog box which allows the user to specify the location of the auto-config script. Thereafter, whenever the browser 210 is started up on host computer 204, it connects to proxy server 208 (or any server specified in the setting), and requests the auto-config script therefrom. The auto-config script is then downloaded from proxy server 208 to host computer 204 in one embodiment. Preferably, the auto-config script includes codes which instructs the browser on which proxy server to use for servicing HTTP requests.

In the example of FIG. 2, the auto-config script comes from the proxy server 208. However, it is contemplated that the auto-config script may be obtained from any suitable server that is accessible by host computer 204 through the LAN or through distributed computer network 112. As long as host computer 204 can access some server to obtain the auto-config script therefrom, the exact server from which the auto-config script is sent is somewhat irrelevant.

Once the auto-config is downloaded to browser 210, it waits until an HTTP request by the browser is initiated. Most browsers typically have a "home" page, i.e., the web page that is automatically accessed when the browser is started up. By way of example, a user who wishes to have access to a search engine, such as Yahoo!, upon starting her browser, may request that the browser automatically connect her to the Yahoo! site whenever the browser is started up. Thus, most browsers typically issue the HTTP request for the home web page automatically after starting up.

Whether the first HTTP request is automatically issued by the browser or manually issued by the user through the browser, the auto-config script detects the HTTP request (e.g., the request for the search page at Yahoo!) and accesses a virus-scan enabling (VSE) server, which in turn dispatches a set of codes capable of creating a local scan engine and/or local proxy server on the host computer to browser 210. In one embodiment, the local scan engine and/or local proxy server executable represents a Java applet, which is maintained at the virus-scan enabling (VSE) server to ensure that it is properly updated for detecting the latest viruses. Thus, as long as the local scan engine and/or local proxy server executable is updated at the VSE server, the resultant local scan engine and/or local proxy server created at the individual host computers during an HTTP transfer session is also updated.

The scan engine/local proxy server executable binds a local port at host computer 204 and creates a local scan engine 230 and a local proxy server 234. Thereafter, the newly created scan engine 230 and local proxy server 234 complete the first HTTP request (e.g., for a Yahoo! search page in this example) for browser 210 using the newly created local scanning and proxy server capabilities.

Note that in the example of FIG. 2, the virus-scan enabling (VSE) server and the central proxy server are both implemented within server 208. However, this is not a requirement as the virus scan enabling (VSE) server may be a computer that is different from the central HTTP proxy server. The VSE server configuration will work as long as the location of the virus-scan enabling (VSE) server is known to the auto-config script to allow the auto-config script to access the VSE server for the purpose of downloading the scan engine/local proxy server executables, in order to enable local virus scanning.

Thereafter, browser 210, responsive to the auto-config script, directs all future HTTP requests and data transfers between the browser and distributed computer network 112 through local scan engine 230 and/or local proxy server 234 without requiring central scanning at central scan engine disposed within HTTP proxy server 208. Subsequent data transfers between distributed computer network 112 and browser 210 may then be accomplished via local scan engine 230 and local proxy server 234.

Once the local proxy server 234 is installed, it can be configured to access 112 directly, without having to go through the HTTP proxy server 208. This is provided that there is no firewall that might prevent the local proxy server 204 from accessing the distributed computer network 112 directly. Hence, local scanning is performed, and not all traffic needs to be channeled through the central HTTP proxy server 208.

In accordance with one aspect of the present invention, it is recognized that if the browser at the host computer does not support the ability to create a local scan engine and redirects the HTTP traffic therethrough, it is necessary to provide some form of virus scanning for those host computers on the LAN although other host computers may employ local virus scanning. An example of such a browser is illustrated as a browser 240 associated with host computer 206.

In one embodiment, if browser 240 does not support the signed applet technology, browser 240 will be unable to grant the downloaded applet that creates the local virus scan engine/local proxy server control over the host computers I/O and system resources in order to bind a local port and redirects HTTP data transfers therethrough for the purpose of performing local virus scanning. In one embodiment, the auto script is furnished with codes to interrogate the version number and/or the capability of the browser at the target host computer. If the browser is capable of supporting local virus scanning, a local scan engine and/or local proxy server are then created as discussed previously, and subsequent HTTP transfers are redirected therethrough to bypass the central virus-scanning module.

On the other hand, if the auto-config script detects that the browser is not capable of supporting local virus scanning (e.g., does not support signed applet in the case of the Java implementation), the auto script directs that all HTTP transfers be performed through a scan engine disposed centrally (e.g., at the network HTTP proxy server) in order to allow virus scanning to be performed at the central server. In this manner, all host computers will have virus scanning support and at least a group of host computers will have the virus scanning performed locally in order to relieve the server overload and/or data transfer delay problems encountered in the prior art when the central server is required to perform virus scanning for all host computers.

Figure 3:
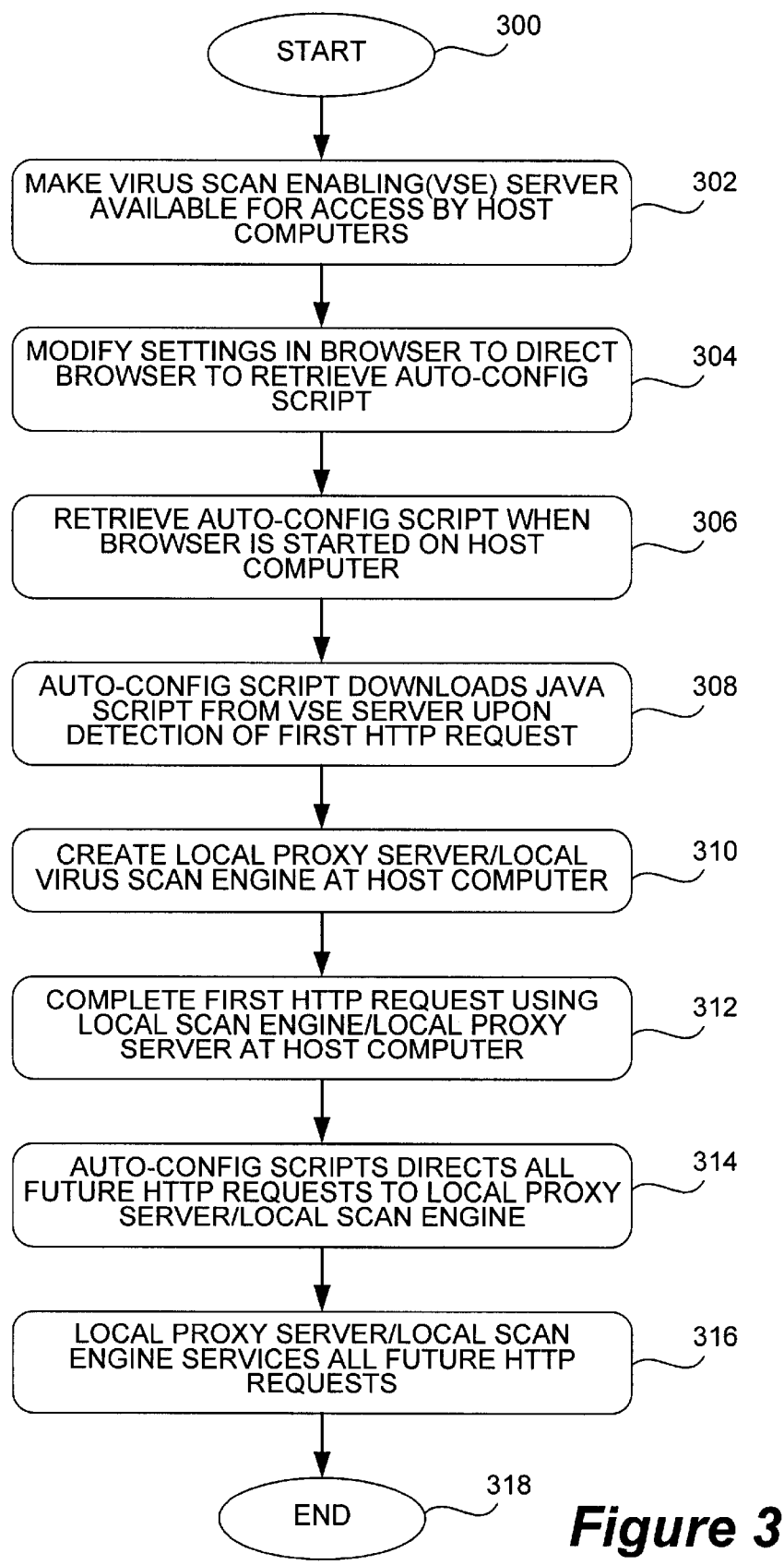
FIG. 3 illustrates, in accordance with one embodiment of the present invention, the steps which may be taken to enable local virus scanning.

FIG. 3 illustrates, in accordance with one embodiment of the present invention, the steps which may be taken to enable local virus scanning. In step 302, the virus scan enabling (VSE) server is started and made available for access by browsers running on host computers connected in the LAN. In step 304, the setting in the browser is modified to direct the browser to the designated location to retrieve the auto-config script. This step may be performed on a one-time basis by either the user or the network administrator, for example.

In step 306, the browser is directed to the designated location to retrieve the auto-config script when the browser is started. In step 308, for the first HTTP request, the auto-config script accesses the VSE server and downloads a local virus scan/local proxy server executable to the host computer. In one embodiment, the downloaded local virus scan/local proxy server executable is a Java applet, although other technologies, such as ActiveX™ by Microsoft Corp., may also be employed.

In step 310, the downloaded local virus scan/local proxy server executable binds a local port on the host computer and acts as a local proxy server. This local virus scan/local proxy server executable also creates the virus scan engine locally, using, for example, the VM engine associated with the browser. In step 312, the local proxy server/local scan engine then completes the first HTTP request for the browser.

In step 314, the auto-config script directs all future HTTP requests through the local proxy server/local scan engine instead of the centralized proxy server/central scan module. In step 316, future HTTP requests are serviced by the local proxy server/local scan engine to relieve the processing and I/O bottleneck associated with the prior art central virus scan approach.

Figure 4:
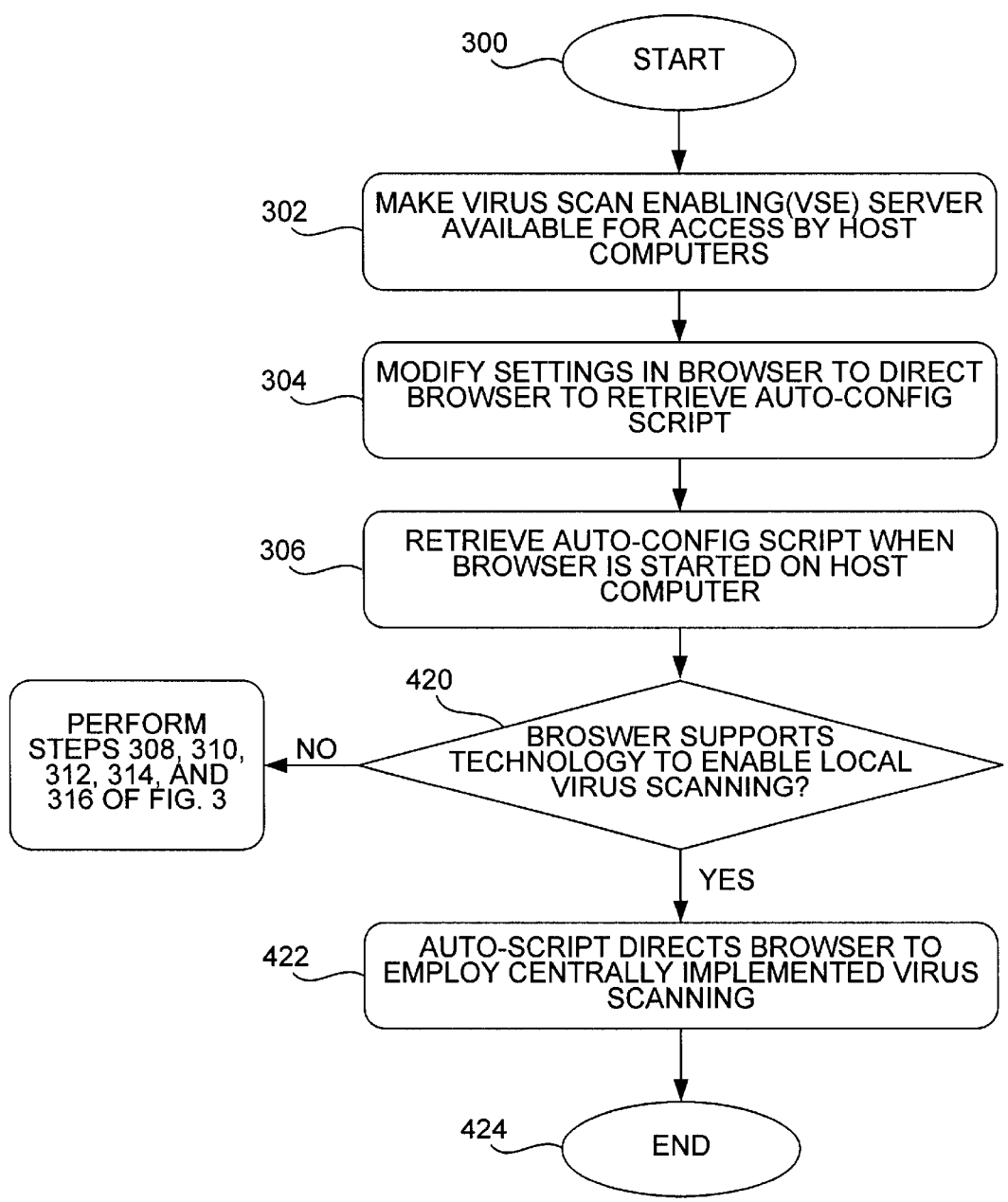
FIG. 4 is a flowchart illustrating the steps that may be taken, in accordance with one embodiment of the present invention, to ensure that virus scanning is enabled for a host computer, even if its browser does not support the technology required to allow the download of the local proxy server/local scan engine executable, as used to create the local proxy server/local scan engine.

FIG. 4 is a flowchart illustrating the steps that may be taken, in accordance with one embodiment of the present invention, to ensure that virus scanning is enabled for a host computer even if its browser does not support the technology required to allow the download of the local proxy server/local scan engine executable to create the local proxy server/local scan engine. In FIG. 4, steps 302, 304, and 306 may be similar to comparably numbered steps in FIG. 3. In the implementation of FIG. 4, however, in addition to implementing the capability described in connection with FIG. 3, the method also allows the auto-config script to determine whether the browser supports the technology required to allow the download of the local proxy server/local scan engine executable to create the local proxy server/local scan engine. This is seen in step 420. As an alternative, the auto-config script may send information about the browser to another computer, e.g., the aforementioned virus scan enabling server or another suitable server, where the determination is made (i.e., the determination of whether the browser in question supports technology required to allow the download of the local proxy server/local scan engine executable to create the local proxy server/local scan engine).

If the browser does have such support, the method proceeds to step 422, where steps 308, 310, 312, 314, and 316 of FIG. 3 take place to enable local virus scanning. On the other hand, if the browser does not support the technology required to allow the download of the local proxy server/local scan engine executable to create the local proxy server/local scan engine, the method proceeds to step 424 wherein the auto-config script directs the browser to employ the centrally implemented proxy server and the centrally implemented virus scan module (which may be implemented in the same or in different computers that are other than the host computer) to service future HTTP requests. Thus, a subset of the host computers on a LAN may implement local virus scanning, which relieves the bandwidth at the centrally implemented virus scan module, while another subset of the host computers on the LAN may employ the centrally implemented virus scan module to perform virus scanning on their behalf. Advantageously, both solutions are supported simultaneously on the same LAN, in accordance with one aspect of the present invention.

As can be appreciated by those skilled in the art, the invention enables the host computers to perform local virus scanning without requiring the concomitant burden of periodic installation, maintenance, and updates at each host computer. By allowing at least some of the host computers to perform virus scanning locally, the processing and I/O resources bottleneck associated with the prior art central virus scanning arrangement is advantageously alleviated. Further, by introducing intelligence into the downloaded auto-config script, it can determine (or have another server determine) whether a particular browser is capable of implementing local virus scanning and take action accordingly. Such action might include ensuring that at least central virus scanning is still available to those browsers that are incapable of implementing local virus scanning. This invention feature provides that every host computer in the LAN is provided with virus scanning even if some cannot perform the desired local virus scanning feature.

Using the invention, scanning of any type of information that can be sent via HTTP is enabled locally. This includes local scanning of active contents, such as executables that may be downloaded to the host machines to facilitate e-commerce. Among examples of these types of active contents are movie clips to demonstrate products, interactive forms to take order and/or payment information, and the like. Local scanning may also be performed on emails and their attachments retrieved using the HTTP protocol, for example.

Furthermore, while HTTP is mentioned herein to facilitate ease and consistency of discussion and understanding, it should be noted that the invention is not limited to any particular protocol. One skilled in the art will recognize that while application of the invention vis-a-vis HTTP is particularly advantageous, the invention may also be applied to information transferred via other protocols as well. Further, although virus scanning is mentioned herein to facilitate ease and consistency of discussion and understanding, it should be noted that other types of add-on services may be similarly implemented locally. By way of example, services such as encrypting/decrypting, encoding/decoding, etc., may be performed locally using the techniques outlined herein (by simply changing the downloaded executable to perform the service desired). Still further, although the LAN implementation is discussed in detail herein, it should be appreciated that the inventive technique may also be adapted to enable a stand-alone host computer to use a VSE server on the Internet to allow it to implement local virus scanning (by, e.g., directing the browser to obtain the auto-config script from an appropriate server connected to the Internet, thereby allowing the browser to download the local virus scanning/local proxy server executable from an appropriate VSE server connected to the Internet). Such adaptation is well within the skills of the artisan having the benefit of the disclosure herein.

While this invention has been described in terms of several preferred embodiments, there are alterations, permutations, and equivalents which fall within the scope of this invention. It is therefore intended that the following appended claims be interpreted as including all such alterations, permutations, and equivalents as fall within the true spirit and scope of the present invention.

What is claimed is:

1. A method for detecting a virus from data transferred between a host computer and the Internet, comprising:
    downloading to said host computer a first set of codes from a designated computer different from said host computer, said first set of codes being configured to create a virus scan module on said host computer;
    creating said virus scan module on said host computer responsive to a request for said data; and
    thereafter, employing said virus scan module to detect said virus in said data transferred between said host computer and said Internet.

2. The method of claim 1 wherein said data is transferred between said host computer and said Internet via a browser.

3. The method of claim 2 wherein said data represents active content.

4. The method of claim 2 wherein said data pertains to an e-commerce transaction.

5. The method of claim 2 wherein said data pertains to data received in an email.

6. The method of claim 2 wherein said request is made according to an HTTP protocol.

7. The method of claim 6 further comprising:
    receiving at said host computer a second set of codes from said designated computer prior to said downloading, said second set of codes causing said host computer to download said first set of codes from said designated computer when a request for said data is issued.

8. The method of claim 7 wherein said first set of codes represents an applet.

9. The method of claim 8 wherein said browser is configured to support signed applets.

10. The method of claim 8 wherein said first set of codes represents executable instructions written in one of Java and ActiveX.

11. The method of claim 7 wherein said second set of codes represents an auto-config script.

12. The method of claim 7 further comprising:
    downloading to said host computer a third set of codes from said designated computer, said third set of codes being configured to create a local proxy server module at said host computer;
    creating said local proxy server module on said host computer responsive to a receipt of said third set of codes at said host computer; and
    thereafter, employing said local proxy server module to facilitate data transfer between said host computer and said Internet.

13. A method for detecting a virus from data transferred between a browser running on a host computer and the Internet, said host computer being coupled to other host computers on a local area network (LAN), comprising:
    receiving at said host computer a first set of codes, said first set of codes being configured to cause said host computer to download a second set of codes from a server coupled to said LAN when a request for data from said Internet is issued from said browser, said second set of codes being configured to create a virus scan module locally on said host computer;
    downloading to said host computer said second set of codes from said server when said request for data from said Internet is issued from said browser;
    creating said virus scan module on said host computer responsive to a receipt of said second set of codes at said host computer; and
    thereafter, employing said virus scan module to detect said virus for said data transferred between said host computer and said Internet.

14. The method of claim 13 wherein said receiving is performed each time said browser is started on said host computer in response to a setting in said browser.

15. The method of claim 13 wherein said request for data represents an HTTP request.

16. The method of claim 13 wherein said second set of codes represents a Java applet.

17. The method of claim 13 wherein said browser is configured to support signed applets.

18. The method of claim 13 wherein said set of codes represents executable instructions written in one of Java and ActiveX.

19. The method of claim 13 wherein said first set of codes represents an auto-config script.

20. The method of claim 13 wherein said data pertains to an e-commerce transaction.

21. The method of claim 13 wherein said data pertains to data received in an email.

22. A method for detecting a virus from data transferred between a browser running on a host computer and the Internet, said host computer being coupled to other host computers on a local area network (LAN), comprising:

receiving at said host computer a first set of codes, said first set of codes being configured to cause, if said browser is determined to be capable of supporting local virus scanning, said host computer to download a second set of codes from a server coupled to said LAN when a request for data from said Internet is issued from said browser, said second set of codes being configured to create a virus scan module locally on said host computer;

determining, using said first set of codes, whether said browser is capable of performing said local virus scanning;

if said browser is determined to be capable of supporting said local virus scanning, performing steps a) through c) below:

a) downloading to said host computer said second set of codes from said server when said request for data from said Internet is issued from said browser, b) creating said virus scan module on said host computer responsive to a receipt of said second set of codes at said host computer, and c) thereafter, employing said virus scan module to detect said virus for said data transferred between said host computer and said Internet.

23. The method of claim 22 further comprising:

if said browser is determined to be incapable of supporting said local virus scanning, employing a centrally implemented virus scanning module to perform said detecting said virus.

24. The method of claim 22 wherein said determining includes determining whether said browser supports signed applet technology.

25. The method of claim 22 wherein said determining includes determining whether said browser permits said second set of codes to bind a local port at said host machine.

26. The method of claim 22 wherein said receiving said first set of codes is performed each time said browser is started on said host computer in response to a setting in said browser.

27. The method of claim 22 wherein said request for data represents an HTTP request.

28. The method of claim 22 wherein said second set of codes represents a Java applet.

* * * * *